United States Patent
Hundemer

(10) Patent No.: US 9,462,314 B1
(45) Date of Patent: *Oct. 4, 2016

(54) SYSTEMS AND METHODS FOR ENABLING FUNCTIONALITY OF A TRIGGER MECHANISM BASED ON LOG ENTRIES IN A TRAFFIC LOG

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/937,264

(22) Filed: Nov. 10, 2015

Related U.S. Application Data

(63) Continuation of application No. 14/727,476, filed on Jun. 1, 2015, now Pat. No. 9,219,933, which is a continuation of application No. 13/833,556, filed on Mar. 15, 2013, now Pat. No. 9,078,027.

(51) Int. Cl.
*H04N 7/10* (2006.01)
*H04N 7/025* (2006.01)
*H04N 21/262* (2011.01)

(52) U.S. Cl.
CPC .. *H04N 21/26258* (2013.01); *H04N 21/26233* (2013.01); *H04N 21/26283* (2013.01)

(58) Field of Classification Search
CPC ................. H04N 21/26258; H04N 21/26283; H04N 21/2323
USPC ........................................................ 725/34
See application file for complete search history.

(56) References Cited

U.S. PATENT DOCUMENTS

| 7,787,058 B1 | 8/2010 | Smereski et al. |
| 9,078,027 B1 * | 7/2015 | Hundemer ........... H04N 21/262 |
| 9,219,933 B1 * | 12/2015 | Hundemer ....... H04N 21/26258 |
| 2008/0092168 A1 | 4/2008 | Logan et al. |

* cited by examiner

*Primary Examiner* — Hunter B Lonsberry
(74) *Attorney, Agent, or Firm* — McDonnell Boehnen Hulbert & Berghoff LLP

(57) ABSTRACT

Disclosed herein are systems and methods for enabling functionality of a trigger mechanism based on log entries in a traffic log. An example method involves (i) accessing a stored traffic log, wherein the log includes multiple ordered log entries including a first log-entry and a second log-entry; (ii) making a first determination that the first log-entry corresponds to a show-segment video-component (VC) of a live show, wherein the first log-entry further corresponds to a broadcast time-period; (iii) making a second determination that the second log-entry is positioned immediately after the first log-entry; (iv) making a third determination that the second log-entry corresponds to a manual start-time type; and (v) responsive to making the three determinations, enabling functionality of a trigger mechanism during the broadcast time-period, wherein the enabled trigger mechanism is configured to cause processing of a next log entry in the log in response to being triggered.

20 Claims, 10 Drawing Sheets

| | Start Time | Start-Time Type | Duration | Segment Identifier | Description | Source Identifier | House Identifier |
|---|---|---|---|---|---|---|---|
| 702-1 → | 7:00:00 | Calculated | | 1 | News A | 402 | |
| 702-2 → | | Manual | 0:00:30 | | Commercial A | 302 | S546785 |
| 702-3 → | | Calculated | 0:00:30 | | Commercial B | 302 | OP465588 |
| 702-4 → | | Calculated | 0:00:30 | | Commercial C | 302 | S158224 |
| 702-5 → | | Calculated | | 2 | News A | 402 | |
| 702-6 → | | Manual | 0:00:30 | | Commercial D | 302 | OP854556 |
| 702-7 → | | Calculated | 0:00:30 | | Commercial E | 302 | S889517 |
| | | | | * * * | | | |
| 702-8 → | | Manual | 0:00:30 | | Commercial M | 302 | S985567 |
| 702-9 → | | Calculated | 0:00:30 | | Commercial N | 302 | S155523 |
| 702-10 → | | Calculated | 0:00:30 | | Commercial O | 302 | S125665 |
| 702-11 → | | Calculated | 0:08:00 | 6 | News A | 402 | |
| 702-12 → | 7:59:00 | Absolute | | | Commercial P | 302 | OP846277 |
| 702-13 → | 7:59:30 | Calculated | 0:00:30 | | Commercial Q | 302 | S856445 |
| 702-14 → | 8:00:00 | Calculated | 0:08:00 | 1 | Sitcom A | 302 | DA0207 |

700 ↗

| | Start Time | Start-Time Type | Duration | Segment Identifier | Description | Source Identifier | House Identifier |
|---|---|---|---|---|---|---|---|
| 702-1 → | 7:00:00 | Calculated | | 1 | News A | 402 | |
| 702-2 → | | Manual | 0:00:30 | | Commercial A | 302 | S546785 |
| 702-3 → | | Calculated | 0:00:30 | | Commercial B | 302 | OP465588 |
| 702-4 → | | Calculated | 0:00:30 | | Commercial C | 302 | S158224 |
| 702-5 → | | Calculated | | 2 | News A | 402 | |
| 702-6 → | | Manual | 0:00:30 | | Commercial D | 302 | OP854556 |
| 702-7 → | | Calculated | 0:00:30 | | Commercial E | 302 | S889517 |
| | | | | * * * | | | |
| 702-8 → | | Manual | 0:00:30 | | Commercial M | 302 | S985567 |
| 702-9 → | | Calculated | 0:00:30 | | Commercial N | 302 | S155523 |
| 702-10 → | | Calculated | 0:00:30 | | Commercial O | 302 | S125665 |
| 702-11 → | | Calculated | 0:08:00 | 6 | News A | 402 | |
| 702-12 → | 7:59:00 | Absolute | | | Commercial P | 302 | OP846277 |
| 702-13 → | 7:59:30 | Calculated | 0:00:30 | | Commercial Q | 302 | S856445 |
| 702-14 → | 8:00:00 | Calculated | 0:08:00 | 1 | Sitcom A | 302 | DA0207 |

| | Start Time | Start-Time Type | Duration | Segment Identifier | Description | Source Identifier | House Identifier |
|---|---|---|---|---|---|---|---|
| 702-1 | 7:00:00 | Calculated | 0:08:00 | 1 | News A | 402 | |
| 702-2 | 7:08:00 | Manual | 0:00:30 | | Commercial A | 302 | S546785 |
| 702-3 | 7:08:30 | Calculated | 0:00:30 | | Commercial B | 302 | OP465588 |
| 702-4 | 7:09:00 | Calculated | 0:00:30 | | Commercial C | 302 | S158224 |
| 702-5 | 7:09:30 | Calculated | | 2 | News A | 402 | |
| 702-6 | | Manual | 0:00:30 | | Commercial D | 302 | OP854556 |
| 702-7 | | Calculated | 0:00:30 | | Commercial E | 302 | S889517 |
| | | | | * * * | | | |
| 702-8 | | Manual | 0:00:30 | | Commercial M | 302 | S985567 |
| 702-9 | | Calculated | 0:00:30 | | Commercial N | 302 | S155523 |
| 702-10 | | Calculated | 0:00:30 | | Commercial O | 302 | S125665 |
| 702-11 | | Calculated | 0:08:00 | 6 | News A | 402 | |
| 702-12 | 7:59:00 | Absolute | | | Commercial P | 302 | OP846277 |
| 702-13 | 7:59:30 | Calculated | 0:00:30 | | Commercial Q | 302 | S856445 |
| 702-14 | 8:00:00 | Calculated | 0:08:00 | 1 | Sitcom A | 302 | DA0207 |

| | Start Time | Start-Time Type | Duration | Segment Identifier | Description | Source Identifier | House Identifier |
|---|---|---|---|---|---|---|---|
| 702-1 → | 7:00:00 | Calculated | 0:08:00 | 1 | News A | 402 | |
| 702-2 → | 7:08:00 | Manual | 0:00:30 | | Commercial A | 302 | S546785 |
| 702-3 → | 7:08:30 | Calculated | 0:00:30 | | Optional Promo A | 302 | OP465588 |
| 702-4 → | 7:09:00 | Calculated | 0:00:30 | | Commercial B | 302 | S158224 |
| 702-5 → | 7:09:30 | Calculated | 0:08:00 | 2 | News A | 402 | |
| 702-6 → | 7:17:30 | Manual | 0:00:30 | | Optional Promo B | 302 | OP854556 |
| 702-7 → | 7:18:00 | Calculated | 0:00:30 | | Commercial C | 302 | S889517 |
| | * * * | | | | | | |
| 702-8 → | 7:49:30 | Manual | 0:00:30 | | Commercial M | 302 | S985567 |
| 702-9 → | 7:50:00 | Calculated | 0:00:30 | | Commercial N | 302 | S155523 |
| 702-10 → | 7:50:30 | Calculated | 0:00:30 | | Commercial O | 302 | S125665 |
| 702-11 → | 7:51:00 | Calculated | 0:08:00 | 6 | News A | 402 | |
| 702-12 → | 7:59:00 | Absolute | 0:00:30 | | Optional Promo C | 302 | OP846277 |
| 702-13 → | 7:59:30 | Calculated | 0:00:30 | | Commercial Q | 302 | S856445 |
| 702-14 → | 8:00:00 | Calculated | 0:08:00 | 1 | Sitcom A | 302 | DA0207 |

SYSTEMS AND METHODS FOR ENABLING FUNCTIONALITY OF A TRIGGER MECHANISM BASED ON LOG ENTRIES IN A TRAFFIC LOG

RELATED DISCLOSURES

This disclosure is a continuation of U.S. patent application Ser. No. 14/727,476 filed Jun. 1, 2015, which is a continuation of U.S. patent application Ser. No. 13/833,556 filed Mar. 15, 2013 (now U.S. Pat. No. 9,078,027 issued Jul. 7, 2015).

USAGE AND TERMINOLOGY

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

the term "video" refers to any material represented in a video format (i.e., having multiple frames). In some instances, video may include multiple sequential frames that are identical or nearly identical, and that may give the impression of a still image. Video may or may not include an audio portion.

the term "video component" (VC) refers to video that one of ordinary skill in the art would typically consider to be self-contained, and that is separately scheduled by a traffic system (also referred to as a scheduling-and-sequencing system) of a television-broadcasting system.

TECHNICAL FIELD

The disclosed systems and methods relate generally to television-broadcasting technology.

BACKGROUND

A television-broadcasting system typically includes a traffic system that performs functions related to broadcast scheduling. For example, the traffic system may facilitate the creation of a traffic-log (log), which is a broadcast schedule for a given station during a given time period. The log may include multiple ordered log entries, each of which may correspond to a VC. Each log entry may also correspond to a start time, and therefore the log may generally represent the scheduled sequence of VCs intended to be broadcast.

There are several types of VCs, non-limiting examples of which include a show-segment VC, a commercial VC, and a promotion VC. A show-segment VC consists of at least a portion of a show, and potentially one or more commercials. A show may be, for example, an episode of a sitcom, a news program, or a movie. A commercial VC consists of a single commercial. Typically, a television-broadcasting company broadcasts a commercial VC in exchange for payment or other compensation from the provider of the commercial VC. A promotion VC consists of video that promotes something such as an event or another VC. Unlike a commercial VC, the television-broadcasting company typically does not receive a payment or other compensation from a third-party for broadcasting the promotion VC.

The traffic system may communicate with a master control system (MCS), which is the technical hub of a television-broadcasting system and is typically the final point before a VC is sent to an air-chain system for broadcast. More specifically, the traffic system typically communicates with an automation system of the MCS. The automation system is the logic center of the MCS and may cause the MCS and/or another entity to perform various functions.

Through a communication path, the traffic system may provide the log to the automation system such that the automation system may select and process log entries. The automation system may then cause one or more entities to perform certain functions for each selected log-entry at an appropriate time (e.g., at the corresponding start time). For example, the automation system may cause a recording-and-playout device (RAPD) to retrieve and playout a stored VC such that it may be channeled through one or more entities within the MCS (e.g., routers and switchers), and sent to an air-chain system for broadcast. In another example, the automation system may cause a streaming VC received from a streaming-video source to be channeled through the MCS and sent to the air-chain system for broadcast.

An example of a streaming-video source is a live-production source, which is a component within a live production system (LPS). An LPS is a system configured to produce and/or output a live show in the form of multiple show-segment VCs such that when broadcast, the show-segment VCs may be separated by commercial or other VCs. Each show-segment VC may be output by the live-production source as it is produced, thereby allowing the show to be broadcast "live." Producing a live show may present certain challenges, particularly with respect to timing issues. For example, it may be challenging to ensure that the timing of a produced show-segment VC is consistent with the timing set forth in the corresponding log. One example of an LPS is a news production system (NPS). In a NPS, the live-production source is a live-news-production source, and the show is a news program.

SUMMARY

In one aspect, a method involves (i) an automation system accessing a stored television-broadcasting traffic log, wherein the traffic log includes multiple ordered log entries, the log entries including at least a first log-entry and a second log-entry; (ii) the automation system making a first determination that the first log-entry corresponds to a show-segment video-component (VC) of a live show, wherein the first log-entry further corresponds to a broadcast time-period; (iii) the automation system making a second determination that the second log-entry is positioned immediately after the first log-entry; (iv) the automation system making a third determination that the second log-entry corresponds to a manual start-time type; and (v) responsive to the automation system making the first, second, and third determinations, the automation system enabling functionality of a trigger mechanism during the broadcast time-period, wherein the enabled trigger mechanism is configured to cause the automation system to process a next log entry in the traffic log in response to being triggered.

In another aspect, an automation system is disclosed. The automation system includes a computer-readable medium having stored thereon program instructions that when executed cause the automation system to perform a set of functions, the set includes: (i) accessing a stored television-broadcasting traffic log, wherein the traffic log includes multiple ordered log entries, the log entries including at least a first log-entry and a second log-entry; (ii) making a first determination that the first log-entry corresponds to a show-segment VC of a live show, wherein the first log-entry further corresponds to a broadcast time-period; (iii) making a second determination that the second log-entry is positioned immediately after the first log-entry; (iv) making a third determination that the second log-entry corresponds to a manual start-time type; and (v) responsive to making the first, second, and third determinations, the automation system enabling functionality of a trigger mechanism during the broadcast time-period, wherein the enabled trigger mechanism is configured to cause the automation system to process a next log entry in the traffic log in response to being triggered.

In another aspect, a television-broadcasting system is disclosed. The television-broadcasting system includes a trigger mechanism and an automation system connected to the trigger mechanism via a communication network. The automation system includes a computer-readable medium having stored thereon program instructions that when executed cause the automation system to perform a set of functions. The set includes: (i) accessing a stored television-broadcasting traffic log, wherein the traffic log includes multiple ordered log entries, the log entries including at least a first log-entry and a second log-entry; (ii) making a first determination that the first log-entry corresponds to a show-segment VC of a live show, wherein the first log-entry further corresponds to a broadcast time-period; (iii) making a second determination that the second log-entry is positioned immediately after the first log-entry; (iv) making a third determination that the second log-entry corresponds to a manual start-time type; and (v) responsive to making the first, second, and third determinations, the automation system enabling functionality of the trigger mechanism during the broadcast time-period, wherein the enabled trigger mechanism is configured to cause the automation system to process a next log entry in the traffic log in response to being triggered.

BRIEF DESCRIPTION OF THE DRAWINGS

FIG. 7A is a diagram of an example log at a first time.

FIG. 7B is a diagram of the example log of FIG. 7A at a second time.

FIG. 7C is a diagram of the example log of FIG. 7A at a third time.

DETAILED DESCRIPTION OF THE DRAWINGS

I. Overview

Figure 1:
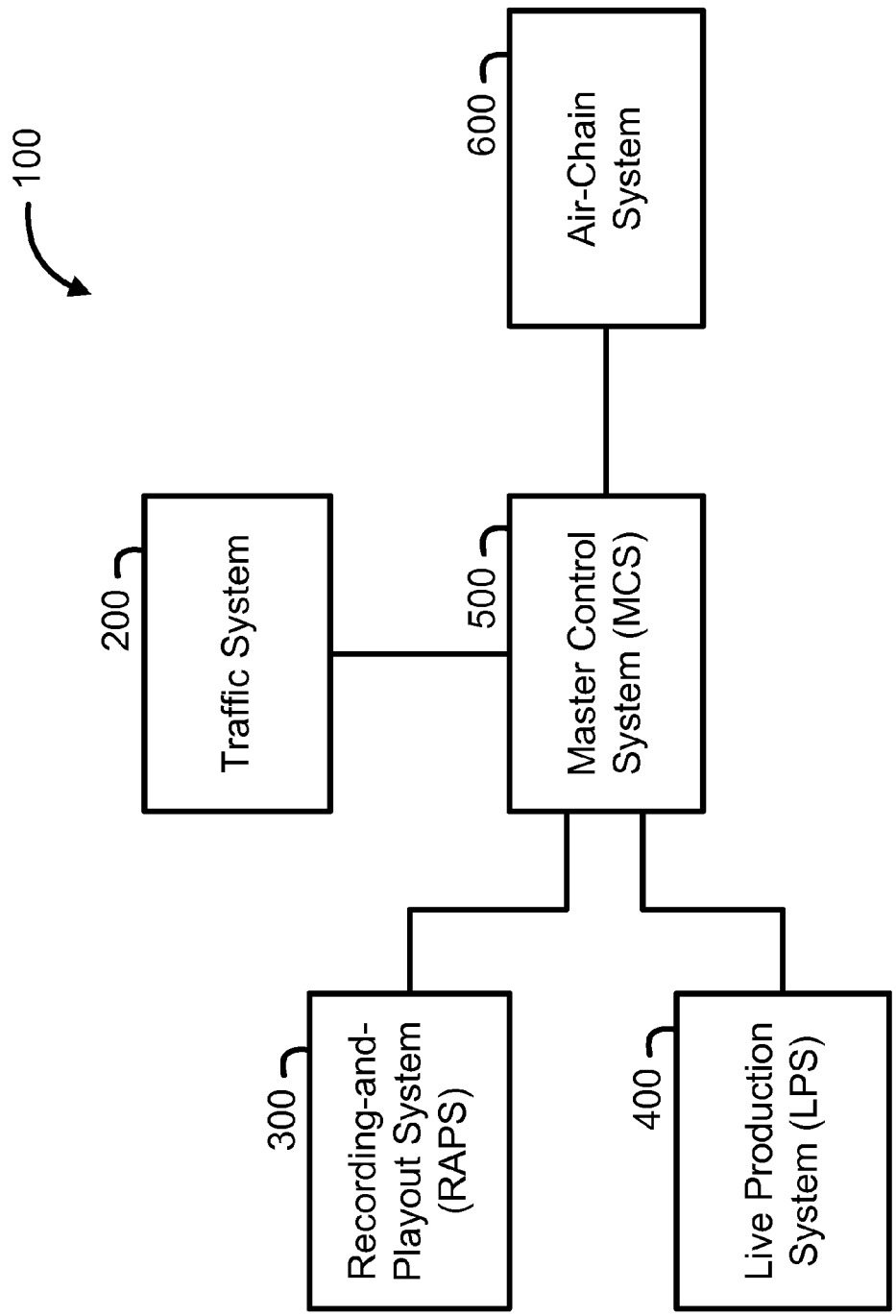
FIG. 1 is a simplified block diagram of an example television-broadcasting system.

As discussed above, an LPS may produce a show-segment VC of a live show. Further, in response to processing a log entry of a log, an automation system may cause the show-segment VC to be broadcast (sometimes referred to as "rolling the log"). The automation system may broadcast the show-segment VC for a predetermined duration before advancing to the next log entry and causing another VC to be broadcast. However, this may cause the show-segment VC to end abruptly from the perspective of a viewer. For example, the show-segment VC may end while a speaker is in mid-sentence while presenting live content of an indeterminate and varying duration. This may create an undesirable experience for viewers.

As an alternative, an automation system may advance to the next log entry when it receives a request from a master control operator. This may allow the show-segment VC to end at a "natural" ending point (e.g., after the speaker provides concluding remarks), and helps ensure that viewers experience a smooth transition from the show-segment VC to another VC. In one configuration, a technical director may determine when the show-segment VC should end and may submit such a request to the mater control operator, who may in turn submit the request to the automation system. Since an LPS is often physically remote from the related automation system, in some instances, the technical director and the master control operator may communicate via a communication system (e.g., via a telephone network).

In one example of the systems and methods disclosed herein, a television-broadcasting system includes an automation system and a trigger mechanism (e.g., a physical or virtual button), both connected to each other over a communication network such as the Internet or a pair of dry-contact wires. The automation system may enable or disable functionality of the trigger mechanism. The enabled trigger mechanism is configured to cause the automation system to process a next log entry in the log in response to being triggered. Since the automation system and the trigger mechanism communicate via a communication network, in one example, the trigger mechanism may be physically located in an LPS that together are physically remote from the automation system. As such, a technical director in the LPS may trigger the enabled trigger mechanism and thereby cause the automation system to stop broadcasting a show-segment VC of a live show (e.g., at a time when a show-segment VC of a live show reaches a "natural" end point), and further cause a commercial VC that corresponds to a next log entry to start being broadcast. Further, this may occur without the need to for the technical director to relay a request through the master control operator as discussed above.

Further, the automation system may selectively enable functionality of the trigger mechanism such that a technical director may only cause the automation system to process a next log entry when one or more conditions are satisfied. In one example, a condition may include a show-segment VC of a live show being followed by a log entry that has a manual start time-type. In the event that this condition is not met, the functionality of the trigger mechanism may be disabled. Therefore, a user who accidentally triggers the trigger mechanism such as while a commercial VC is being broadcast, the user may be prevented from causing the automation system to advance to the next log entry.

As noted above, functionality of the trigger mechanism may be enabled when certain conditions are satisfied. In one example, the automation system may make determinations related to these conditions by analyzing attributes of log entries. In the television-broadcasting industry, traffic systems are provided by multiple vendors and often include distinguishing features. However, for a variety of reasons such as to provide compatibility, many traffic systems create logs according to a general industry-wide standard. Likewise, many automation systems are configured to receive and process logs based on this standard. A log entry based on this standard typically includes certain attributes, including for example a house identifier, a source identifier, an episode identifier, a segment identifier, a start-time type, a start time, a duration, a description and/or one or more auxiliary notations. These attributes may be generated automatically (e.g., by the traffic system) or may be provided by a user such as a traffic manager.

Typically, a log entry includes at least one of a house identifier and a source identifier. If the log entry corresponds to a stored VC, the log entry typically includes a house identifier (sometimes called a "house number"), which identifies the stored VC. Typically, a house identifier is a unique identifier within a given television-broadcasting system, and maps to a file location in a data storage where the VC is stored. As such, by obtaining the house identifier of a log entry, the automation system may use a mapping table to determine the appropriate file location, and may then cause the VC that is stored in that file location to be retrieved and played. In this instance, the log entry may also include a source identifier that identifies a particular RAPD to be used for retrieving and playing the stored VC.

Alternatively, if the log entry corresponds to a streaming VC, the log entry may correspond to a streaming-video source (e.g., a live-production source) that outputs the streaming VC. In one example, the log entry includes a source identifier, which identifies the streaming-video source (e.g., via a mapping table).

If a log entry corresponds to a show-segment VC, the log entry may have a segment identifier (sometimes called a "segment number") that identifies a particular segment of the show. If the log entry corresponds to a stored show-segment VC, the log entry may further include an episode identifier (sometimes called an "episode number") that identifies a particular episode of the show.

The start-time type indicates how and/or when the start time is determined. The start-time type may be absolute, calculated, or manual. An absolute start-time type indicates that the start time is a fixed time that may be determined before any log entries in the log are processed. This is sometimes referred to as a "hard" start time. A calculated start-time type indicates that the start time is when the automation system completes processing the preceding log entry (i.e., when the VC of the previous log entry has played for its corresponding duration), and may be determined when the start time and duration of the previous log entry are known by the automation system. A manual start-time type indicates that the start time is when a request is received from a user or device, and therefore is determined when the request is received. As such, each log entry may correspond to a start time, but the start time may be unknown until some event occurs.

The duration indicates the duration of the corresponding VC. As with the start time, in some instances, the duration may be unknown until some event occurs (e.g., until the automation system receives a request from a user or device). The description provides a title and/or other information about the corresponding VC. For example, the description may be a title of a particular show or commercial. The one or more auxiliary notations are typically notes that are reviewed by a user (e.g., a traffic manager may provide a note to a master control operator about the corresponding log entry).

The above-described attributes may be stored in corresponding fields in the log entry. For example, the house identifier may be stored in a house-identifier field and the one or more auxiliary notations may be stored in one or more auxiliary-notation fields. Two examples of well-known traffic systems that use the attributes as described above include WO Traffic provided by WideOrbit Inc. of San Francisco, Calif., and OSi-Traffic™ provided by Harris Corporation of Melbourne, Fla.

In some examples, by analyzing log entries and select attributes as described above, the automation system may make certain determinations such that it may selectively enable of disable functionality of the trigger mechanism.

II. Example Television-Broadcasting System

FIG. 1 shows an example television-broadcasting system, generally designated 100. The television-broadcast system 100 may be configured to perform a variety of functions that relate to television broadcasting. The television-broadcasting system 100 may include a traffic system 200, a recording-and-playout system (RAPS) 300, an LPS 400, a MCS 500, and an air-chain system 600. The MCS 500 may serve as the hub of the television-broadcasting system 100 and may connect to each of the traffic system 200, the RAPD 300, the LPS 400, and the air-chain system 600. Generally, the television-broadcasting system 100 may be configured such that video may be sent from the RAPS 300, the LPS 400, or another source, through the MCS 500, and to the air-chain system 600 for broadcast.

A. Traffic System

Figure 2:
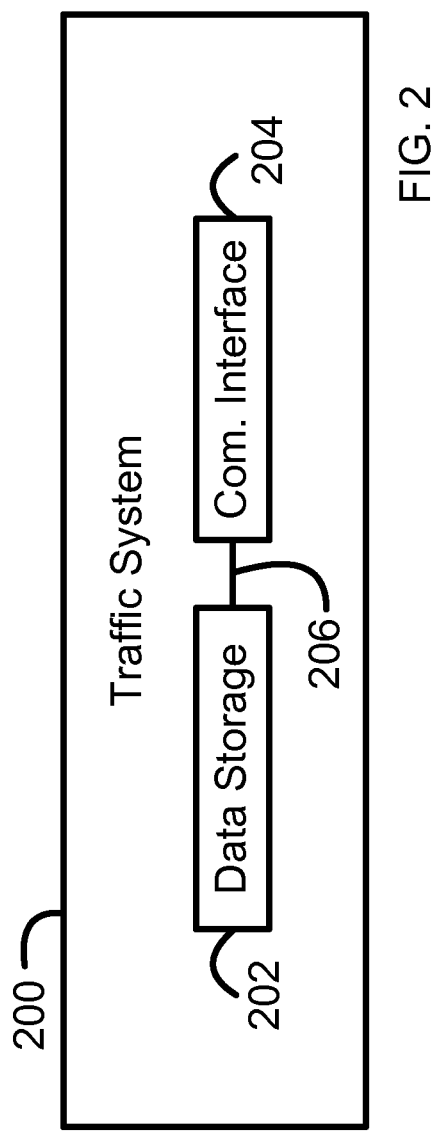
FIG. 2 is a simplified block diagram of an example traffic system.

FIG. 2 shows the traffic system 200 in greater detail. The traffic system 200 may be configured for creating and sending a log to the MCS 500, and may include a data storage 202 and a communication interface 204, both of which may be connected to each other via a connection mechanism (e.g., a bus) 206. The traffic system 200 may be configured to store logs in the data storage 202, and to send the stored logs, via the communication interface 204, to the MCS 500. As discussed above, two example traffic systems are WO Traffic provided by WideOrbit Inc. of San Francisco, Calif., and OSi-Traffic™ provided by Harris Corporation of Melbourne, Fla.

B. RAPS

Figure 3:
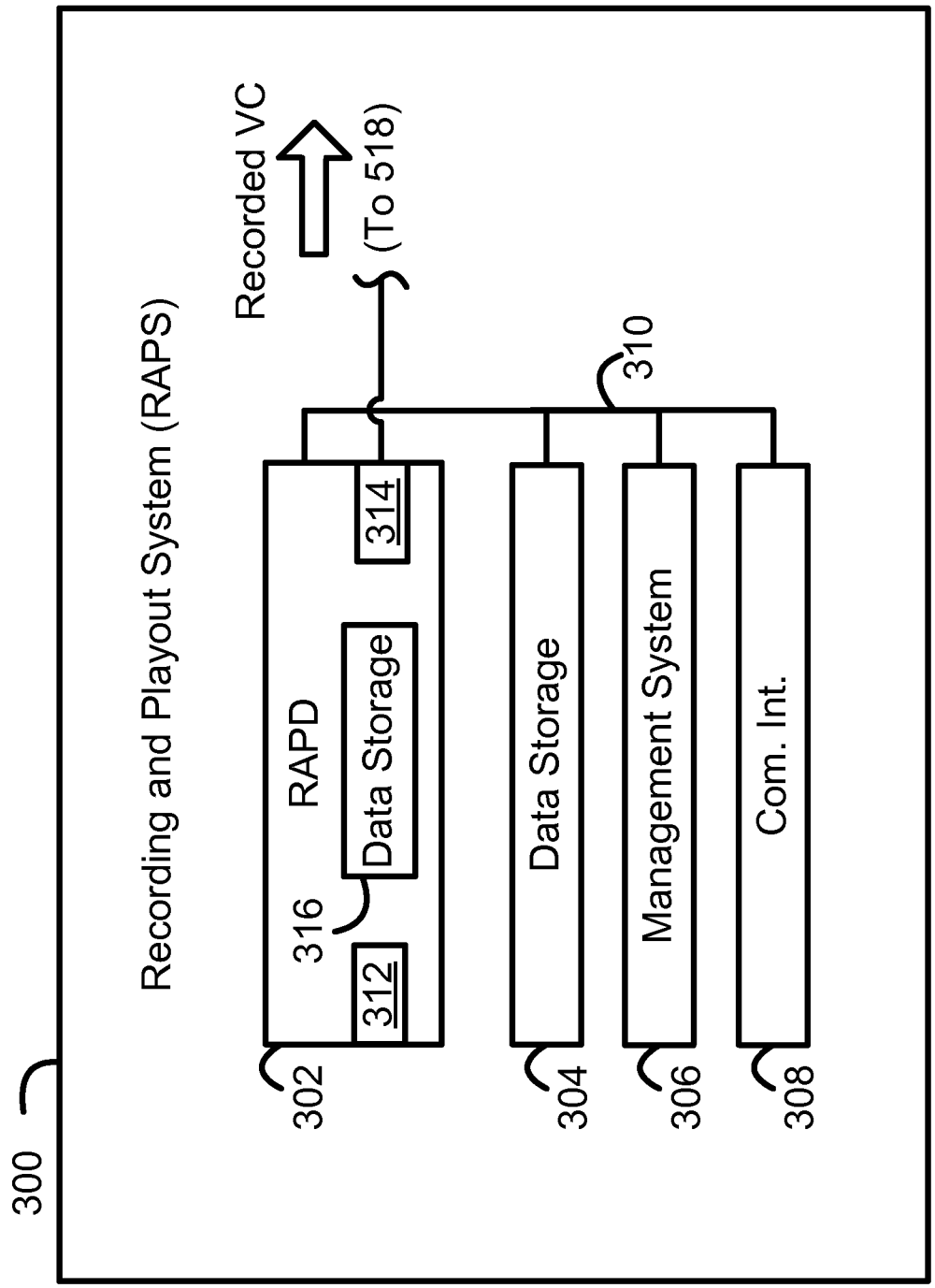
FIG. 3 is a simplified block diagram of an example recording-and-playout system.

FIG. 3 shows the RAPS 300 in greater detail. The RAPS 300 may be configured to record and/or playout video (e.g., VCs) for use by the MCS 500, and may include a recording-and-playout device (RAPD) 302, a data storage 304, a management system 306, and a communication interface 308, each of which may be connected to each other via a connection mechanism 310.

The RAPD 302 may be configured to record and/or playout video, such as by sending video via the MCS 500 to the air-chain system 600. The RAPD 302 may include an input 312, an output 314, and a data storage 316, all of which may be connected to each other by a connection mechanism (not shown).

The management system 306 may be configured to manage the RAPD 302 by organizing and moving video back-and-forth between the RAPD and the data storage 304. The communication interface 308 may connect the RAPS 300 to the MCS 500 or to another entity. An example of a RAPD is the K2 server provided by Grass Valley™ of San Francisco, Calif.

C. LPS

Figure 4:
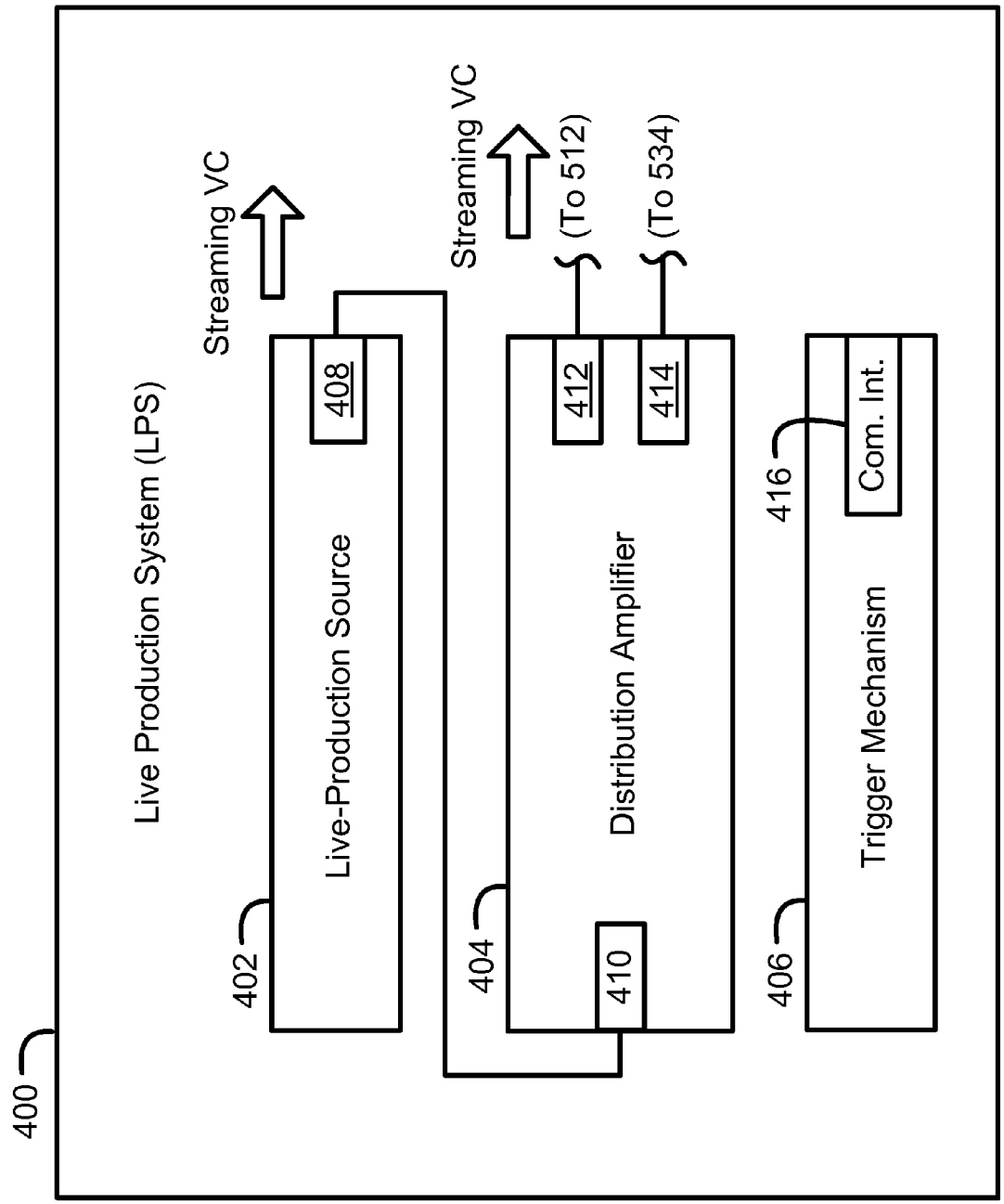
FIG. 4 is a simplified block diagram of an example live production system.

FIG. 4 shows the LPS 400 in greater detail. LPS 400 may include a live-production source 402, a distribution amplifier 404, and a trigger mechanism 406. The live-production source 402 is any device that outputs a show-segment VC produced in the LPS 400. The live-production source may take the form of, for example, a production control switcher (e.g., where the LPS is an NPS). In one example, the live-production source 402 may provide streaming VCs based on the high-definition serial digital interface (HD-SDI) standard with a data transfer rate of 1.485 Gbps.

The distribution amplifier 404 that may be used to distribute copies of the streaming VCs to multiple destinations. In one example, the live-production source 402 may include an output 408 that is connected to an input 410 of the distribution amplifier 404. Therefore, the streaming VC provided by the live-production source 402 may be distributed to one or more destinations via respective outputs of the distribution amplifier 404, including for example a first output 412, and a second output 414.

The trigger mechanism 406 may include a communication interface 416 for communicating with the automation system 508. The trigger mechanism may take various forms, including for example, a physical button or a virtual button included in an electronic user-interface (e.g., a graphical user-interface (GUI)). The trigger mechanism may be configured to cause the automation system 508 to process a next log entry of a log in response to being triggered by a user or device. In one example, the automation system 508 and/or the trigger mechanism 406 may enable or disable such functionality.

D. MCS

Figure 5:
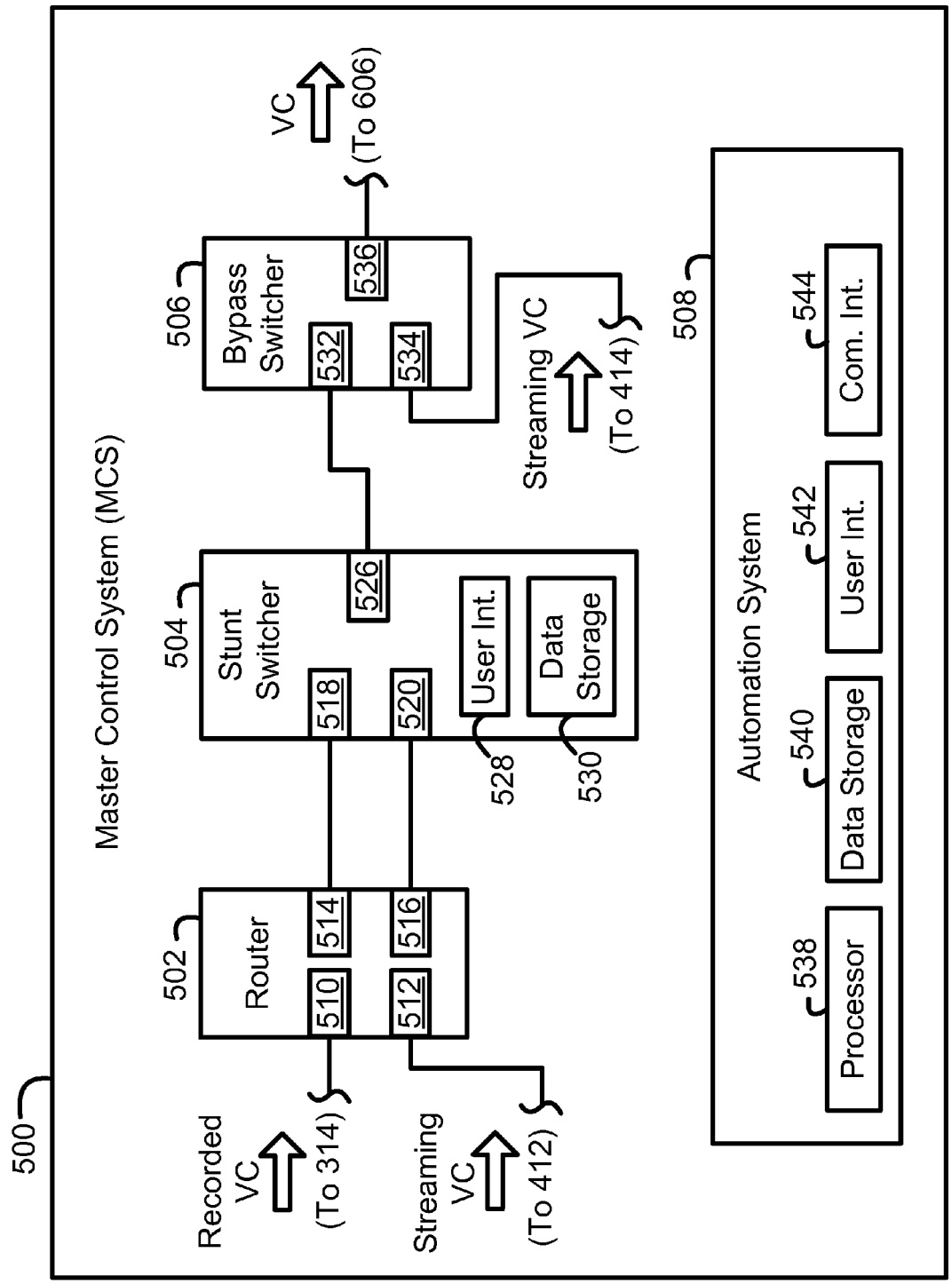
FIG. 5 is a simplified block diagram of an example master control system.

FIG. 5 shows the MCS 500 in greater detail. The MCS 500 may be configured to receive video, channel the video through one or more sources, and send the video to the air-chain system 600 for broadcast. In one example, the MCS 500 includes a router 502, a stunt switcher 504, a bypass switcher 506, and an automation system 508, each of which may be connected to each other by a connection mechanism (not shown).

1. Router

The router 502 may be configured to channel video by mapping inputs to outputs, and may include one or more inputs, including for example, a first input 510 and a second input 512, and one or more outputs, including for example, a first output 514 and a second output 516. The router 502 may also include a communication interface (not shown). The inputs 510, 512, the outputs 514, 516, and the communication interface may each be connected to each other by a connection mechanism (not shown). Notably, a router may and often does have more inputs than outputs such that it may connect many sources to relatively fewer destinations.

The RAPD 302 may be connected to the router 502 via the output 314 and the input 510. Therefore, the RAPD 302 may send VCs to the router 502. The distribution amplifier 404 may be connected to the router 502 via the output 412 and the input 512. As such, the live-production source 402 may send a streaming VC via the distribution amplifier 404 to the router 502. An example of a router is the Blackmagic Design Videohub provided by Blackmagic Design Pty. Ltd. Of Fremont, Calif.

2. Stunt Switcher

The stunt switcher 504 may be configured to channel video by mapping inputs to outputs, and may include one or more inputs, including for example, a first input 518 and a second input 520, and one or more outputs, including, for example, an output 526. The stunt switcher 504 may also include a user interface 528, a data storage 530, and a communication interface (not shown).

The inputs 518, 520, the output 526, the user interface 528, the data storage 530, and the communication interface may each be connected to each other by a connection mechanism (not shown). The router 502 may be connected to the stunt switcher 504 via the output 514 and the input 518. The router 502 may also be connected to the stunt switcher 504 via the output 516 and the input 520. Like a router, a stunt switcher may and often does have more inputs than outputs such that it may connect many sources to relatively fewer destinations. An example of a stunt switcher is the Miranda NVISION NVS5100MC provided by NVision, Inc. of Coppell, Tex.

The stunt switcher 504 may further be configured to perform various functions related to digital video effects (DVE). A DVE is an effect module (e.g., in the form of a set of program instructions) that is configured to be executed or "run." When run, a DVE dynamically manipulates video being channeled through the stunt switcher. Running a DVE may involve using one or more layers known as "keys" to overlay graphics, video, or other media on video. In some instances, running a DVE may involve simply "resetting" the keys, thereby removing any media being overlayed as a result of another DVE being run.

The stunt switcher 504 may be configured to assist a user in designing a DVE, such as via the user interface 528. Once a DVE is designed, the stunt switcher 504 may store the DVE in the data storage 530. In one example, the stunt switcher may store DVEs in respective DVE registers within the data storage 530. The stunt switcher 504 may also store media used in connection with the DVE in the data storage 530. This allows the stunt switcher 504 to retrieve media as needed. For example, when running a DVE, the stunt switcher 504 may retrieve media from a particular graphic or video register in the data storage 530 as indicated by the DVE. Media may be stored in the data storage 530 in a variety of manners, such as via a file transfer protocol (FTP). As such, by overwriting media stored in the data storage 530, the result of a DVE that is run may be changed.

Once a DVE is designed and stored in the data storage 530, the stunt switcher 504 may then retrieve and run the DVE. In some instances, this may occur in response to a request being received from a user (e.g., via the user interface 528) or from the automation system 508. Accordingly, when a stunt switcher runs a DVE, a VC that is being channeled through the stunt switcher 504 may be dynamically manipulated. This manipulated video may then be sent through the bypass switcher 506 and to the air-chain system 600 for broadcast as described in greater detail below.

3. Bypass Switcher

The bypass switcher 506 may be configured to channel video by mapping inputs to outputs. The bypass switcher 506 may include at least one input including, for example, a first input 532 and a second input 534, and at least one output including, for example, an output 536. The bypass switcher 506 may also include a communication interface (not shown). The inputs 532, 534, the output 536, and the communication interface may all be connected to each other by a connection mechanism (not shown). The stunt switcher 504 may be connected to the bypass switcher 506 via the output 526 and the input 532. A bypass switcher may and often does have multiple inputs and a single output such that it may connect many sources to relatively fewer destinations.

Accordingly, provided that the router 502, the stunt switcher 504, and the bypass switcher 506 all have the appropriate input-to-output mappings, a VC sent from the RAPD 402 to the MCS 500 may be channeled through the entities in the MCS and sent out the MCS. Likewise, provided that the router 502, the stunt switcher 504, and the bypass switcher 506 all have the appropriate input-to-output mappings, a streaming VC sent from the LPS 400 to the MCS 500 may be channeled through the entities in the MCS and sent out the MCS.

In some instances, the distribution amplifier 404 may be connected directly to the bypass switcher 506 (e.g., via the output 414 and the input 534). This configuration may provide for a back-up solution in the event that a device such as the router 502 or stunt switcher 504 malfunctions. If such an event occurs while using this configuration, a master control operator may simply change the input-to-output mappings on the bypass switcher 506 to cause the live-production source 402 to send video to the air-chain system 600 for broadcast.

4. Automation System

The automation system 508 may be configured to perform or to cause performance of one or more functions related to the television-broadcasting system 100. The automation system 508 may include a processor 538, a data storage 540, a user-interface 542 (e.g., including a display device), and a communication interface 544, all of which may be connected by a connection mechanism (not shown). The processor 538 may include one or more general-purpose processors (e.g., microprocessors) and/or special-purpose processors (e.g., digital signal processors and/or application specific integrated circuits).

The data storage 540 may include one or more volatile and/or non-volatile storage components and may be integrated in whole or in part with the processor 538. The data storage 540 may take the form of a non-transitory computer-readable medium and may include a set of program instructions, that when executed by the automation system 508 (e.g., by the processor 538), cause performance of a set of functions. For example, the automation system 508 may cause the RAPS 300, the LPS 400, the MCS 500, the air-chain system 600, an entity included therein, and/or another entity to perform one of more of the functions described in this disclosure. The automation system 508 may cause such functions to be performed by sending instructions and/or other data via a corresponding communication interface and/or connection mechanism to the appropriate device.

The automation system 508 may receive data via the same path. In one example, the automation system 508 sends and receives data according to a video disk control protocol (VDCP). For example, the automation system 508 may receive from the bypass switcher 506, an indication of the input-to-output mappings used by the bypass switcher such that the automation system may determine whether a scheduled VC was actually sent to the air-chain system 600 for broadcast. The automation system 508 may use these indications to generate an as-run log, which is a report of what was actually broadcast.

In some instances, the automation system 508 may perform functions described herein as being performed by the traffic system 200. Likewise, in some instances, the traffic system 200 may perform functions described herein as being performed by the automation system 508. This may be the case, for example, where the traffic system 200 and the automation system 508 operate using a "live log" approach, where the traffic system 200 may be configured to query the automation system 508, manage the log and make scheduling-related decisions itself, and provide log entries (perhaps one at a time) to the automation system for processing.

E. Air-Chain System

Figure 6:
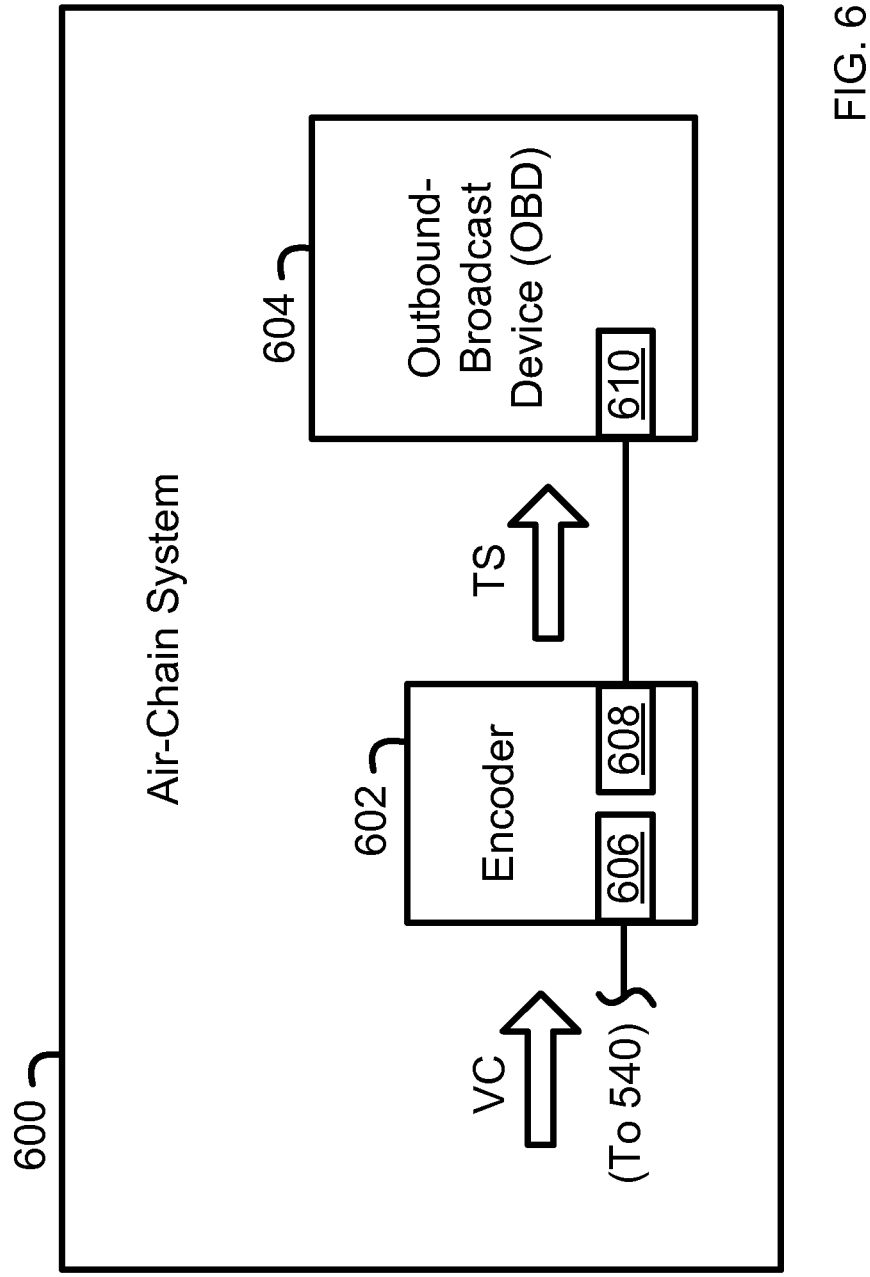
FIG. 6 is a simplified block diagram of an example air-chain system.

FIG. 6 shows the air-chain system 600 in greater detail. The air-chain system 600 may be configured to prepare and broadcast video received from the MCS 500 to an audience. The air-chain system 600 may include an encoder 602 and an outbound-broadcast device (OBD) 604.

The encoder 602 may be configured to receive video from a source entity, generate a transport stream (TS) (that includes the video), and send the generated TS to a destination entity. The TS may be described as including video, meaning that the TS includes the encoded representation of the video, among other things. The encoder 602 may include an input 606 and an output 608, each of which may be connected by a connection mechanism (not shown). The bypass switcher 506 may be connected to the encoder 602 via the output 534 and the input 606.

In one example, the encoder 602 may generate a TS by, among other things, encoding video based on the HD-SDI standard to video based on the MPEG 2 standard. An example of an encoder is the NetVX provided by Harris Corporation of Melbourne, Fla.

The OBD 604 may be configured to receive a TS from a source entity, and broadcast the TS (i.e., including video) to multiple destination entities for viewing by an audience. The OBD 604 may include an input 610, and the encoder 602 may be connected to the OBD via the output 608 and the input 610.

The term television-broadcast as used in this disclosure refers broadly to the distribution of video to an audience, and is not meant to be limited to distribution of video in any particular manner. Accordingly, the OBD 604 may take the form of a transmitter, satellite, or terrestrial fiber transmitter (e.g., any of which may correspond with a service provider). As another example, the OBD 604 may also take the form of a network connection (e.g., for broadcasting the TS to an audience via the Internet).

The television-broadcasting system 100 described above is one non-limiting example. The disclosed systems may include some or all of the entities and/or components discussed above, and/or they may be arranged in different ways as would be apparent to one of ordinary skill in the art. Also, the described connections between entities need not be direct connections, but could instead be indirect connections (i.e., with one or more intervening components being present).

III. Example Log

Each of FIGS. 7A-7C shows an example log 700 at a different time. The log 700 has rows of log entries 702 (specifically, 702-1 through 702-14) that the automation system 508 may select and process. The log 700 covers a one hour time period from 7:00:00 to 8:00:00 (times and time periods are represented in "hours:minutes:seconds" format). The log 700 corresponds to a live show, namely a news program entitled News A (except the last log-entry 702-14, which corresponds to an episode of a sitcom entitled Sitcom A.). Notably, a news program is used merely as an example. As discussed above, there are other types of live shows, including for example, a sporting event or a concert.

As the automation system 508 processes the log entries 702, the automation system may determine attributes that were previously unknown. As such, the automation system 508 may update the log 700 with attributes as it processes the log entries 702. To illustrate this concept, each of FIGS. 7A-7C shows the log 700 at a different time. FIG. 7A shows the log 700 at time 7:00:00, FIG. 7B shows the log at time 7:08:00, and FIG. 7C shows the log 700 at time 7:49:30. It should be noted that the log entries 702 and attributes used for the example log 700 are for illustration purposes and do not necessarily reflect actual values in any particular log.

Each log entry 702 includes multiple attributes. As shown in log 700 from left to right, each log entry 702 may include a start time, a start-time type, duration, a segment identifier, a description, a source identifier, and a house identifier. In some instances, a log entry may have alternative attributes. The log 700 will now be discussed with respect to each of the times 7:00:00, 7:08:00, and 7:49:30 as shown in FIGS. 7A, 7B, and 7C, respectively.

A. Log at Time 7:00:00 (FIG. 7A)

Referring now to FIG. 7A, at time 7:00:00, the log entry 702-1 includes a start time of 7:00:00, a start-time type of calculated, a segment identifier of 1, a description of News A, and a source identifier of 402 (in this example referring to the live-production source 402). Notably, other identifier may also be used as live-production source identifiers.

As another example, the log entry 702-2 includes a start-time type of manual, a duration of 0:00:30, a description of Commercial A, a source identifier of 302 (in this example referring to the RAPD 302), and a house identifier of S546785.

Since the log entry 702-1 is immediately followed by the log entry 702-2 that has a start-time type of manual, at time 7:00:00 the start time of the log entry 702-2 is unknown. However, upon the automation system 508 receiving a request (e.g., from a user) to process the log entry 702-2, the automation system may determine the duration of the log entry 702-1 and the start time of the log entry 702-2.

B. Log at Time 7:08:00 (FIG. 7B)

Referring now to FIG. 7B, assuming that the automation system 508 receives the request at time 7:08:00, at time 7:08:00 the automation system 508 may determine that the duration of the log entry 702-1 is 0:08:00 and that the start time of the log entry 702-2 is 7:08:00. Further, since the log entries 702-3, 702-4, and 702-5 each have a start-time type of calculated, at 7:08:00, the automation system 508 may also determine the start times of the log entries 702-3, 702-4, and 702-5. However, since the log entry 702-6 has a start-time type of manual, at time 7:08:00 the automation system 508 may still be unable to determine the duration of the log entry 702-5 and the start time of the log entry 702-6.

C. Log at Time 7:49:30 (FIG. 7C)

Referring now to FIG. 7C, assuming the automation system 508 receives a request to process the log entry 702-8 at time 7:49:30, at time 7:49:30 the automation system 508 may determine the start time of each log entry 702-8, 702-9, 702-10, and 702-11 (in the manner described above). Further, since at time 7:49:30 the log entry 702-12 has a known start time (since the log entry 702-12 has a start-time type of absolute), the automation system 508 may also determine the duration of the log-entry 702-11.

IV. Example Methods

Figure 8:
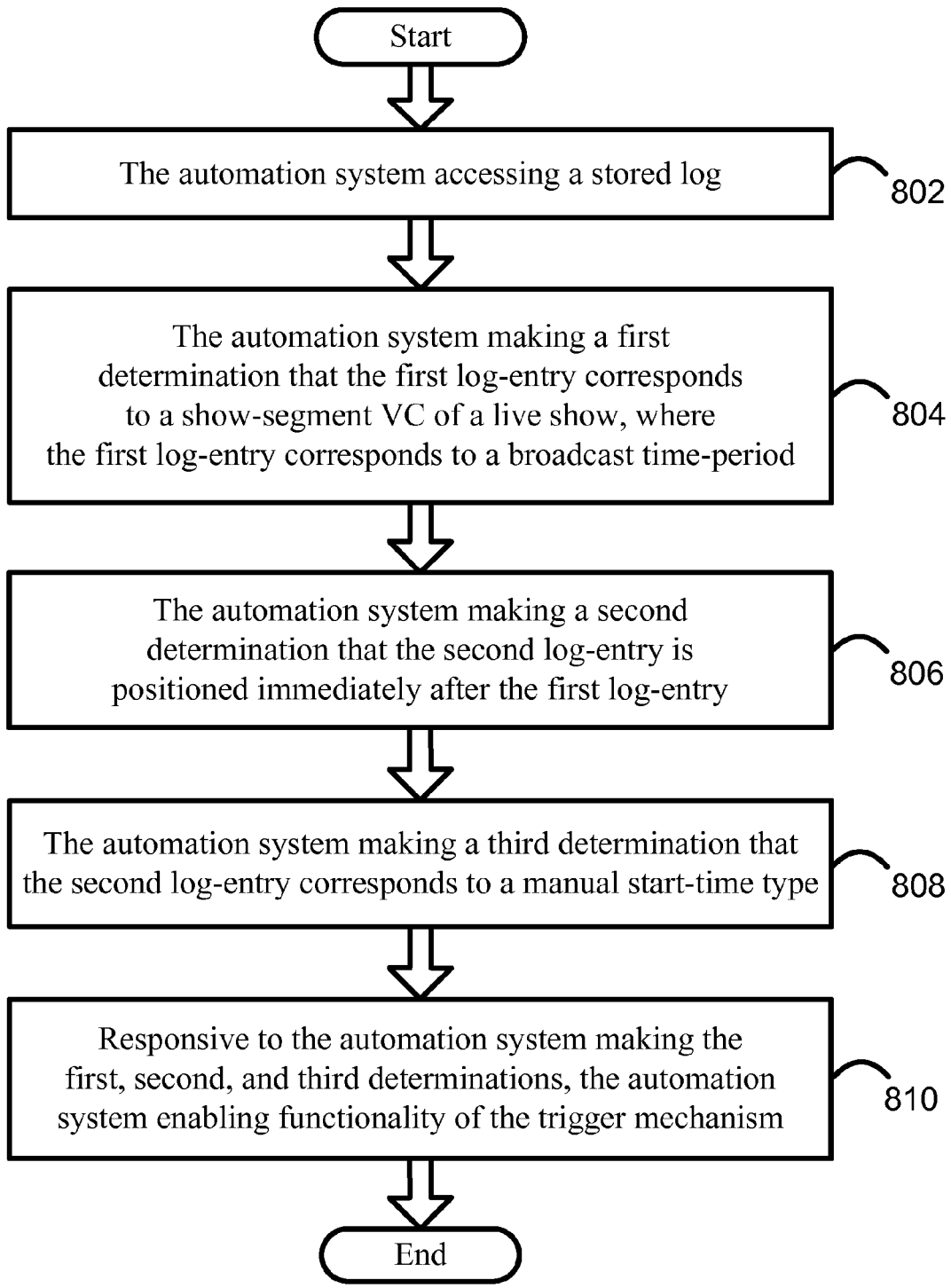
FIG. 8 is a flow chart illustrating functions in accordance with an example method.

FIG. 8 shows a flow chart illustrating functions in accordance with an example method. The description of the method is accompanied by references to the log 700 as shown in FIGS. 7A, 7B, and 7C to illustrate select functions.

At block 802, the method may involve the automation system 508 accessing a stored log. The log may include log entries including at least a first log-entry and a second log-entry. For example, the automation system 508 may access the log 700 that includes the log-entry 702-5 and the log entry 702-6. In one example, the automation system 508 may receive the log 700 from the traffic system 200.

At block 804, the method may involve the automation system 508 making a first determination that the first log-entry corresponds to a show-segment VC of a live show (e.g., a live news program), where the first log-entry corresponds to a broadcast time-period. For example, the automation system 508 may make a first determination that the log entry 702-5 corresponds to a currently broadcasting show-segment VC of the live news program News A. In this instance, the broadcast time-period may start at 7:09:30, the start-time the log entry 702-5 (FIG. 7B), and may end when the automation system 508 received a manual request to process the next log entry 702-6.

The automation system 508 making the first determination may involve the automation system determining that a source identifier stored in a source-identifier field of the first log-entry corresponds to a live-production source. For example, the automation system 508 may determine that the log entry 702-5 corresponds to a live-production source since the log entry 702-11 includes a live-production source identifier in the source-identifier field.

At block 806, the method may involve the automation system 508 making a second determination that the second log-entry is positioned immediately after the first log-entry. For example, the automation system 508 may make a second determination that the log entry 702-6 is positioned immediately after the log entry 702-5.

At block 808, the method may involve the automation system 508 making a third determination that the second log-entry corresponds to a manual start-time type. For example, the automation system 508 may make a third determination that the log entry 702-6 corresponds to a manual start-time type.

The automation system 508 making the third determination may involve the automation system 508 determining that the second log-entry includes a manual start-time type stored in a start-time type field of the second log-entry. For example, the automation system 508 may determine that the log entry 702-6 includes a manual start time-type stored in a start-time type field of the log entry 702-6.

At block 810, the method may involve responsive to the automation system 508 making the first, second, and third determinations, the automation system enabling functionality of the trigger mechanism 406 during the broadcast time-period. As discussed above, the enabled trigger mechanism 406 may be configured to cause the automation system 508 to process a next log entry in the log 700 in response to being triggered. For example, the enabled trigger mechanism 406 may send a request to the automation system 508 (e.g., via the Internet), and in response to receiving the request, the automation system 508 may process the next log entry.

The automation system 508 may enable functionality of the trigger mechanism in a variety of manners. For example, the automation system 508 may send a message to the trigger mechanism 406 causing it to be unable to be triggered. In addition or in the alternative, the automation system 508 may send a message to the trigger mechanism 406 causing it to refrain from sending requests to the automation system 508 in response to being triggered. In addition or in the alternative, the automation system 508 may simply refrain from processing the next log entry in response to receiving a request from the trigger mechanism 406.

In one example, further in response to the automation system 508 making the first, second, and third determinations, the automation system 508 may provide an alert during the broadcast time-period indicating that the trigger mechanism is enabled. For instance, a trigger mechanism that takes the form of a physical button may be equipped with a light that becomes lit or that becomes lit with a designated color for the duration of the broadcast time-period. As another example where the trigger mechanism takes the form of a virtual button included as part of an electronic user-interface, the user-interface may display a message or otherwise provide such as indication during the duration of the time-period.

In one example where the trigger mechanism 406 is physically located within the LPS 402, during the broadcast time-period (i.e., while a show-segment VC of a live show is being broadcast), a user such as technical director (or a device in response to receiving a request from a user) may trigger the trigger mechanism 406, and thereby cause the automation system 508 may process the next log-entry. As a result, the show-segment VC stops being broadcast and the next scheduled VC (typically a commercial VC) starts being broadcast.

Further in response to triggering the enabled trigger mechanism, the automation system 508 may disable the trigger mechanism. Among other things, this may prevent user from inadvertently triggering the trigger mechanism 406 after the broadcast time-period has lapsed (at least until the automation system 508 makes the first, second, and third determinations against with respect to another pair of log entries).

In one example, the automation system 508 may perform select functions, in response to detecting a triggering event. A triggering event may involve, for example, the automation system 508 receiving the log or updating the log in some manner. For example, a triggering event may involve the automation system 508 adding or removing a log entry from the log (e.g., in response to a request from a user). As another example, a triggering event may involve the automation system 508 changing a start-time type, a start time, and/or duration of a log entry in the log (e.g., in response to a request from a user). In one example, select functions, such as those at blocks 804, 806, and 808 may be performed in response to a triggering event.

V. Example Variations

While one or more functions of the disclosed methods have been described as being performed by the certain entities (e.g., the automation system 508), the functions may be performed by any entity, such as those included in the television-broadcasting system 100 described above. Further, the described steps throughout this application need not be performed in the disclosed order, although in some examples, an order may be preferred. Also, not all steps need to be performed to achieve the desired advantages of the disclosed systems and methods, and therefore not all steps are required. Further, the variations described throughout this disclose may be applied to any of the disclosed systems or methods.

Further, while select examples have been described, alterations and permutations of these examples will be apparent to those of ordinary skill in the art. Other changes, substitutions, and alterations are also possible without departing from the disclosed systems and methods in its broader aspects as set forth in the following claims.

The invention claimed is:

1. A method comprising:
   accessing a stored television-broadcasting traffic log, wherein the traffic log includes multiple ordered log entries, the log entries including at least a first log-entry and a second log-entry;
   making a first determination that the first log-entry corresponds to a show-segment video-component (VC) of a live show, wherein the first log-entry further corresponds to a broadcast time-period;
   making a second determination that the second log-entry is positioned immediately after the first log-entry;
   making a third determination that the second log-entry corresponds to a manual start-time type; and
   responsive to making the first, second, and third determinations, an automation system enabling functionality of a trigger mechanism during the broadcast time-period, wherein the enabled trigger mechanism is configured to cause the automation system to process a next log entry in the traffic log in response to being triggered.

2. The method of claim 1, further comprising receiving the traffic log from a traffic system.

3. The method of claim 1, wherein making the first determination comprises determining that a source identifier stored in a source-identifier field of the first log-entry corresponds to a live-production source.

4. The method of claim 1, wherein the first log-entry includes a start time, and wherein the broadcast time-period begins at the start time.

5. The method of claim 1, further comprising:
   triggering the enabled trigger mechanism; and
   responsive to triggering the enabled trigger mechanism, (i) processing the second log-entry, and (ii) disabling the trigger mechanism.

6. The method of claim 1, wherein the trigger mechanism comprises a physical button or a virtual button included in an electronic user-interface.

7. The method of claim 1, further comprising:
   responsive to making the first, second, and third determinations, providing an alert during the broadcast time-period indicating that the trigger mechanism is enabled.

8. The method of claim 1, further comprising detecting a triggering event, wherein making the first, second, and third determinations occur in response to detecting the triggering event.

9. The method of claim 8, wherein detecting the triggering event comprises determining that a start time of a log entry in the traffic log has changed.

10. The method of claim 1, wherein making the first determination that the first log-entry corresponds to a show-segment VC of a live show comprises making the first determination that the first log-entry corresponds to a show-segment VC of a news program.

11. A non-transitory computer-readable medium having stored thereon program instructions that when executed cause performance of a set of functions, the set comprising:
   accessing a stored television-broadcasting traffic log, wherein the traffic log includes multiple ordered log entries, the log entries including at least a first log-entry and a second log-entry;
   making a first determination that the first log-entry corresponds to a show-segment video-component (VC) of a live show, wherein the first log-entry further corresponds to a broadcast time-period;
   making a second determination that the second log-entry is positioned immediately after the first log-entry;
   making a third determination that the second log-entry corresponds to a manual start-time type; and
   responsive to making the first, second, and third determinations, enabling functionality of a trigger mechanism during the broadcast time-period, wherein the enabled trigger mechanism is configured to cause an automation system to process a next log entry in the traffic log in response to being triggered.

12. A non-transitory computer-readable medium having stored thereon program instructions that when executed cause performance of a set of functions, the set comprising:
   accessing a stored television-broadcasting traffic log, wherein the traffic log includes multiple ordered log entries, the log entries including at least a first log-entry and a second log-entry;
   making a first determination that the first log-entry corresponds to a show-segment video-component (VC) of a live show, wherein the first log-entry further corresponds to a broadcast time-period;
   making a second determination that a second log-entry, positioned immediately after the first log-entry, corresponds to a manual start-time type; and
   responsive to making at least the first and second determinations, enabling functionality of a trigger mechanism during the broadcast time-period, wherein the enabled trigger mechanism is configured to cause an automation system to process a next log entry in the traffic log in response to being triggered.

13. The computer-readable medium of claim 12, the set of functions further comprising receiving the traffic log from a traffic system.

14. The computer-readable medium of claim 12, wherein making the first determination comprises determining that a source identifier stored in a source-identifier field of the first log-entry corresponds to a live-production source.

15. The computer-readable medium of claim 12, wherein the first log-entry includes a start time, and wherein the broadcast time-period begins at the start time.

16. The computer-readable medium of claim 12, wherein the trigger mechanism comprises a physical button or a virtual button included in an electronic user-interface.

17. The computer-readable medium of claim 12, the set of functions further comprising:
   responsive to making the first and second determinations, providing an alert during the broadcast time-period indicating that the trigger mechanism is enabled.

18. The computer-readable medium of claim 12, the set of functions further comprising:
   detecting a triggering event, wherein making the first and second determinations occur in response to detecting the triggering event.

19. The computer-readable medium of claim 18, wherein detecting the triggering event comprises determining that a start time of a log entry in the traffic log has changed.

20. The computer-readable medium of claim 12, wherein making the first determination that the first log-entry corresponds to a show-segment VC of a live show comprises making the first determination that the first log-entry corresponds to a show-segment VC of a news program.

* * * * *